US012168988B2

(12) United States Patent
Lang et al.

(10) Patent No.: US 12,168,988 B2
(45) Date of Patent: Dec. 17, 2024

(54) MOVEMENT APPARATUS, TIRE HANDLING APPARATUS AND METHOD FOR OPERATION OF A FLUIDIC ACTUATOR

(71) Applicant: FESTO SE & CO. KG, Esslingen (DE)

(72) Inventors: Johannes Lang, Donzdorf (DE); Hannes Weber, Plüderhausen (DE)

(73) Assignee: Festo SE &Co. KG, Esslingen (DE)

( * ) Notice: Subject to any disclaimer, the term of this patent is extended or adjusted under 35 U.S.C. 154(b) by 742 days.

(21) Appl. No.: 17/283,806

(22) PCT Filed: Oct. 9, 2019

(86) PCT No.: PCT/EP2019/077376
§ 371 (c)(1),
(2) Date: Apr. 8, 2021

(87) PCT Pub. No.: WO2020/074588
PCT Pub. Date: Apr. 16, 2020

(65) Prior Publication Data
US 2022/0001502 A1  Jan. 6, 2022

(30) Foreign Application Priority Data

Oct. 10, 2018  (DE) .......................... 102018217337.0

(51) Int. Cl.
*F15B 11/048* (2006.01)
*B23Q 3/18* (2006.01)

(52) U.S. Cl.
CPC .............. *F15B 11/048* (2013.01); *B23Q 3/18* (2013.01)

(58) Field of Classification Search
CPC ... F15B 11/046; F15B 11/048; B29D 30/0603
See application file for complete search history.

(56) References Cited

U.S. PATENT DOCUMENTS

| 3,932,079 A | * | 1/1976 | Legostaev | .......... | B29D 30/0603 |
| | | | | | 425/38 |
| 4,608,219 A | * | 8/1986 | Singh | ................. | B29D 30/0016 |
| | | | | | 264/315 |

(Continued)

FOREIGN PATENT DOCUMENTS

| DE | 3708989 A1 * | 10/1988 | | |
| DE | 4201464 A1 * | 7/1993 | ............ | F15B 11/048 |

(Continued)

*Primary Examiner* — Thomas E Lazo
(74) *Attorney, Agent, or Firm* — Hoffmann & Baron, LLP (57) ABSTRACT

A movement apparatus for industrial automation, in particular for handling a workpiece, including: a fluidic actuator to which a pressurised fluid can be applied, with a actuator element, and a pressurised fluid provision device which is designed to apply the pressurised fluid to the fluidic actuator according to a control signal, in order to move the actuator element into a predefined position. The pressurised fluid provision device is designed to, whilst the actuator element is in movement to the predefined position, successively change a pressure of the pressurised fluid and/or a throttle opening which is used for providing the pressurised fluid, according to a predefined value course, in order to adapt the movement of the actuator element.

17 Claims, 5 Drawing Sheets

(56) References Cited

U.S. PATENT DOCUMENTS

| | | | | |
|---|---|---|---|---|
| 4,728,274 | A | * | 3/1988 | Siegenthaler ........... B29C 33/36 |
| | | | | 425/88 |
| 5,622,669 | A | * | 4/1997 | Dailliez ................. B29C 33/36 |
| | | | | 264/297.6 |
| 2004/0050241 | A1 | * | 3/2004 | Sakaki ................ F15B 11/0426 |
| | | | | 91/31 |
| 2004/0200349 | A1 | * | 10/2004 | Moler ....................... F15B 9/09 |
| | | | | 91/465 |
| 2007/0144165 | A1 | * | 6/2007 | Kobata ................. F15B 11/048 |
| | | | | 60/459 |
| 2012/0279212 | A1 | * | 11/2012 | Fagerlund ............. F15B 21/087 |
| | | | | 60/462 |
| 2013/0145926 | A1 | * | 6/2013 | Koeckemann ...... F15B 11/0426 |
| | | | | 91/363 R |
| 2016/0025114 | A1 | * | 1/2016 | Perkins ................ F15B 21/087 |
| | | | | 91/51 |

FOREIGN PATENT DOCUMENTS

| | | | | |
|---|---|---|---|---|
| DE | 10122297 | C1 | 6/2002 | |
| DE | 20218487 | U1 | 3/2003 | |
| DE | 102006049491 | A1 | 4/2008 | |
| DE | 102014003084 | A1 | 9/2015 | |
| EP | 2644904 | A1 * | 10/2013 | ............ F15B 11/048 |
| GB | 2472004 | A * | 1/2011 | ............ F15B 21/087 |
| WO | WO-2006122339 | A1 * | 11/2006 | ............ F15B 11/042 |
| WO | 2016023569 | A1 | 2/2016 | |
| WO | 2017076430 | A1 | 5/2017 | |
| WO | 2020074588 | A1 | 4/2020 | |

* cited by examiner

MOVEMENT APPARATUS, TIRE HANDLING APPARATUS AND METHOD FOR OPERATION OF A FLUIDIC ACTUATOR

This application claims priority based on an International Application filed under the Patent Cooperation Treaty, PCT/EP2019/077376, filed on Oct. 9, 2019.

BACKGROUND OF THE INVENTION

The invention relates to a movement apparatus for industrial automation, in particular for handling a workpiece, comprising a fluidic actuator with an actuator element, to which fluidic actuator a pressurised fluid can be applied, and a pressurised fluid provision device which is designed to apply the pressurised fluid to the fluidic actuator in accordance with a control signal, in order to move the actuator element into a predefined position.

SUMMARY OF THE INVENTION

WO 2017/076430 A1 describes a valve controller for the control and regulation of a pneumatic movement task. A damping function is provided for damping a piston movement.

Generally, such a damping function for damping a piston movement is a closed-loop movement control and/or closed-loop position control, in which the actual movement and/or the actual position of the piston is continuously detected and a closed-loop control is effected according to a desired movement and/or a sequence of desired positions.

An object of the invention lies in providing a possibility of movement adaption for the initially mentioned movement apparatus, said adaptation being able to be applied in a versatile and simple manner.

The object is achieved by a movement apparatus according to claim 1. According to the invention, the pressurised fluid provision device is designed to successively change a pressure of the pressurised fluid and/or a throttle opening which is used for providing the pressurised fluid, according to a predefined value course whilst the actuator element moves to the predefined position, in order to adapt the movement of the actuator element, in particular to slow it down.

Consequently, at a point in time, at which the actuator element is moving to the predefined position—thus is being actuated by the pressurised fluid provision device—a predefined value course for the pressure and/or the throttle opening is run through. This predefined value course is run through in a so-to-speak "inflexible" manner and in particular is not subjected to a closed-loop position control and/or a closed-loop movement control. Expediently therefore, a simple open-loop position control—the control according to the control command for the movement of the actuator element into the defined position—is superimposed with the predefined value course of the pressure and/or throttle opening, so that as a whole an adapted movement of the actuator element results, without having to fall back on a closed-loop movement control for this. Since no closed-loop movement control is necessary for the movement adaption, the movement adaption can be employed in a very versatile and simple manner.

Expediently, the value course is such that a damped movement, in particular a movement which is braked towards the predefined position, results.

Advantageous further developments are the subject-matter of the dependent claims.

The invention further relates to method for the operation of a fluidic actuator with a actuator element, to which fluidic actuator a pressurised fluid can be applied, comprising the steps: according to a control signal, applying the pressurised fluid to the fluidic actuator, in order to move the actuator element into a predefined position, and, whilst the actuator element is in movement to the predefined position, successively changing a pressure of the pressurised fluid and/or a throttle opening which is used for providing the pressurised fluid, according to a predefined value course, in order to influence the movement of the actuator element.

Expediently, the method is carried out by using the movement apparatus and/or is designed in correspondence with the movement apparatus.

BRIEF DESCRIPTION OF THE DRAWINGS

Exemplary details and exemplary embodiments are hereinafter explained with reference to the figures. Herein are shown in.

DETAILED DESCRIPTION

Figure 1:
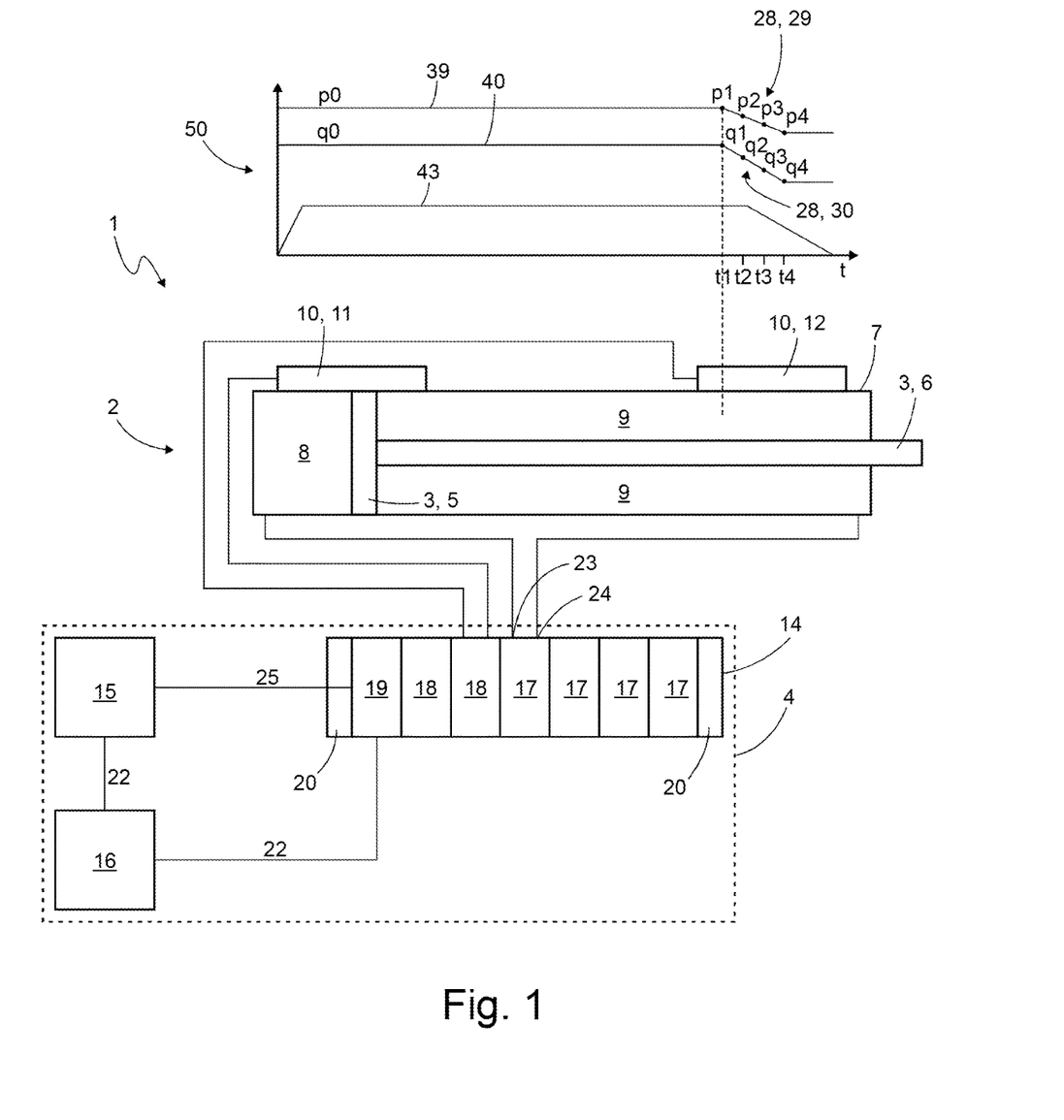
FIG. 1 a schematic representation of a movement apparatus together with a diagram which shows a pressure graph, a throttle opening graph and a speed graph, FIG. 2 a schematic representation of a valve device, FIG. 3 a schematic representation of a tire handling apparatus, FIG. 4 a further exemplary value course, and FIG. 5 a schematic representation of a user interface.

FIG. 1 shows an exemplary design of a movement apparatus 1. The movement apparatus 1 is employed in particular in industrial automation, for example in factory automation. The movement apparatus 1 serves for handling a workpiece, for example a tire, in particular a tire blank, in particular for transporting it.

The movement apparatus 1 comprises a fluidic, in particular pneumatic, actuator 2 which comprises a actuator element 3. The actuator 2 can be subjected to a pressurised fluid, in particular to pressurised air, in order to bring the actuator element 3 into movement.

The movement apparatus 1 further comprises a pressurised fluid provision device 4 for providing the pressurised fluid. The pressurised fluid provision device 4 is designed to subject the fluidic actuator 2 to a pressurised fluid according to a control signal, in order to move the actuator element 3 into a predefined position. Expediently, the predefined position is specified by the control signal.

The pressurised fluid provision device 4 is further designed to successively change a pressure of the pressurised fluid and/or a throttle opening which is used for providing the pressurised fluid, according to a predefined value course whilst the actuator element 3 is situated in movement to the predefined position. In this manner, the movement of the actuator element 3 can be adapted in a simple and versatile manner.

Further exemplary details are explained hereinafter.

Firstly concerning the fluidic actuator 2:

The fluidic actuator 2 is expediently a pneumatic actuator which can be impinged by pressurised air. By way of example the fluidic actuator 2 is designed as a drive, in particular as a drive cylinder. The fluidic actuator 2 by way of example comprises an actuator body 7, the actuator element 3 and at least one pressure chamber 8, 9. Expediently, the fluid actuator 2 comprises two pressure chambers 8, 9, which can be impinged by pressure separately from one another, and in particular is designed as a dual-acting actuator. Alternatively to this, the fluid actuator can also comprise only one pressure chamber and accordingly be designed as a single-acting actuator.

The actuator body 7 is preferably designed as a cylinder and comprises an inner volume. The actuator element 3 by way of example comprises a piston 5 and/or a piston rod 6. The piston 5 is arranged in the actuator body 7 and subdivides the inner volume of the actuator body 7 into the two pressure chambers 8, 9. The pressure chamber 8 is hereinafter denoted as the first pressure chamber 8 and the pressure chamber 9 as the second pressure chamber 9. The actuator element 3 can be expediently brought into at least two different positions. By way of example, the actuator element 3 can be brought into two end positions. The predefined position is expediently an end position. The movement apparatus preferably comprises an end stop which defines the predefined position, in particular an end position. Expediently, the movement apparatus comprises two end stops which define the two end positions. In a first end position, the actuator element 3 is for example extended, in particular maximally extended and in a second end position the actuator element 3 is for example retracted, in particular maximally retracted. In order to get from the one end position to the other end position, the actuator element 3 moves along a movement path, in particular a movement path which is linear relative to the actuator body 7.

In order to bring the actuator element 3 into movement, at least one of the pressure chambers 8, 9 is subjected to pressurised fluid, so that a pressure difference sets in between the two pressure chambers 8, 9 and the piston 5 is actuated by way of a force which results from the pressure difference.

The fluidic actuator 2 expediently comprises a sensor device 10. In particular, the sensor device 10 serves for detecting a position of the actuator element 3. The sensor device 10 by way of example is arranged on the actuator body 7 at the outside. The sensor device 10 comprises for example two sensor units 11, 12 which are arranged distributed along the movement path of the actuator element 3. By way of example, a sensor unit 11, 12 is arranged in the region of an end position of the actuator element 3. Preferably, each sensor unit 11, 12 is designed to detect the presence of the actuator element 3 in an end position. Expediently, each sensor unit 11, 12 is further designed to detect that the actuator element 3 is located in particular at a predefined position in the region of an end position, in particular in front of an end position. In particular, a sensor unit 11, 12 is located in the region of the position of the actuator element 3 which is defined by the control signal. Each sensor unit 11, 12 can comprise for example one or more (not shown in the figures) sensor elements, in particular magnet sensor elements, for example Hall sensor elements. Expediently, a magnet whose magnetic field can be detected by the sensor device 10 is arranged on the actuator element 3. The magnet for example is an annular magnet which is expediently integrated in the piston 5.

Expediently, the sensor device 10 is designed to detect the position of the actuator element 3 only in a part region of the movement path of the actuator element 3—namely preferably in the region of one or both end positions.

Alternatively to the shown design with two sensor units 11, 12, the sensor device 10 can also comprise only one sensor unit or more than two sensor units.

The actuator element 3 is expediently coupled to a workpiece (not shown in FIG. 1) which is handled, in particular gripped and/or transported, by way of actuating the actuator element 3.

The pressurised fluid provision device 4 is dealt with next:

The pressurised fluid provision device 4 by way of example comprises a valve arrangement 14, a superordinate controller 15 and/or optionally a cloud server 16. Two pressure outlets 23, 24 for providing a pressurised fluid, in particular pressurised air, are present on the valve arrangement 14. Each of the two pressure outlets 23, 24 is fluidically connected to a respective pressure chamber 8, 9. In the aforementioned alternative design, according to which the actuator 2 comprises only one pressure chamber, accordingly only one pressure outlet is connected to a pressure chamber.

Expediently, the pressurised fluid provision device 4 is designed to adjust the pressures at the two pressure outlets 23, 24 separately from one another. The pressurised fluid provision device by way of example comprises pressure sensors (not shown in the figures) which are provided for example on the valve arrangement 14 and with which the pressure at the pressure outlets 23, 24 can be determined. Preferably, the pressurised fluid provision device 4 is designed to carry out a closed-loop pressure control, in order to closed-loop control the pressures which are provided at the pressure outlets 23, 24, to defined setpoint pressure values.

By way of example, the valve arrangement 14 comprises a plurality of modules, e.g. valve modules 17 and/or I/O modules 18. By way of example, the valve arrangement 14 comprises two I/O modules 18, but can also comprise more or fewer I/O modules 18. The valve arrangement 14 further comprises a control unit 19 which can preferably likewise be designed as a module. The valve arrangement 14 expediently comprises a base body 20, in particular a base plate, on which the control unit 19, the valve slides 17 and/or the I/O module 18 are arranged.

The valve arrangement 14 by way of example is designed as a series module arrangement; i.e., the modules mentioned above are preferably series modules which are preferably designed in plate-shaped. In particular, the valve modules 17 are designed as valve slides. The series modules are expediently rowed onto one another along the longitudinal axis of the valve arrangement 14.

The valve arrangement 14 is expediently communicatively connected to the superordinate controller 15 and/or to the cloud server 16. By way of example, the valve arrangement 14 is connected to the superordinate controller 15 via a bus 25, in particular a local bus, for example a field bus, and/or optionally to the cloud server 16 via a wide area network 22, for example the internet.

The cloud server 16 is designed for example to carry out a data management and/or a state monitoring.

The pressurised fluid provision device 4, in particular the valve arrangement 14, is expediently communicatively connected to the sensor device 10, in particular via the I/O module 18. Expediently, sensor values which are detected by the sensor device 10 are made available to the control unit 19, the superordinate controller 15 and/or the cloud server 16. Expediently, sensor values of the aforementioned pressure sensors are likewise made available to the control unit 19, the superordinate controller 15 and/or to the cloud server 16.

The superordinate controller 15 by way of example is designed as a memory-programmable control, SPS, and is communicatively connected to the valve arrangement 14, in particular to the control unit 19. Expediently, the superordinate controller 15 is further connected to the cloud server 16, in particular via a wide area network 22, preferably via the internet The pressurised fluid provision device 4 is expediently designed to provide the aforementioned control signal, according to which the fluid actuator 2 is pressurized with the pressurised fluid. In particular, the control signal is provided in the superordinate controller 15, in the cloud server 16 and/or the control unit 15. The control signal for example specifies a position, in particular an end position, into which the actuator element 3 is to be moved, in particular in the course of a position control, in particular an open-loop position control. Furthermore, the control signal can also specify a desired pressure, to which the fluidic actuator 2 is to be pressurized. In particular, the control signal can specify a desired pressure for the first pressure chamber 8, the second pressure chamber 9 and/or a pressure difference between the first pressure chamber 8 and the second pressure chamber 9.

If a position for the actuator element 3 is specified by the control signal, then the pressurised fluid provision device 4, in particular the superordinate controller 15, the cloud server 16 and/or the control unit 19 is designed to provide a desired pressure signal according to the specified position, said desired pressure signal indicating the desired pressure, to which the fluidic actuator 2 is to be pressurized. The desired pressure signal in particular comprises a desired pressure value for the first pressure chamber 8 and/or the second pressure chamber 9 and/or for a pressure difference between the first pressure chamber 8 and the second pressure chamber 9.

In an exemplary design, the desired pressure signal is provided in the superordinate controller 15 and is transferred to the control unit 19. The control unit 19 then subjects the pressure chambers 8, 9 to pressure according to the desired pressure signal. In particular, the control unit 19 provides a desired pressure value for each of the pressure outlets which are connected to the pressure chambers 8, 9 and closed-loop controls the pressures which are provided at the pressure outlets, in accordance with the desired pressure values.

The pressurised fluid provision device 4 is expediently designed to carry out the position control of the fluidic actuator—thus the control, with which the actuator element is to be brought into the predefined position—as a control, in particular open-loop control, thus in particular not as a regulation which is to say not as a closed-loop control. In particular, no closed-loop position control takes place in which the actual position of the actuator element 3 is continuously detected and the desired pressure signal and/or pressure application of the fluidic actuator 2 is continuously adapted on the basis of the actual position and the desired position. Instead, preferably a desired pressure signal is provided on the basis of the control signal and this desired pressure signal is retained at least over a section, in particular at least half, of the movement path.

Figure 2:
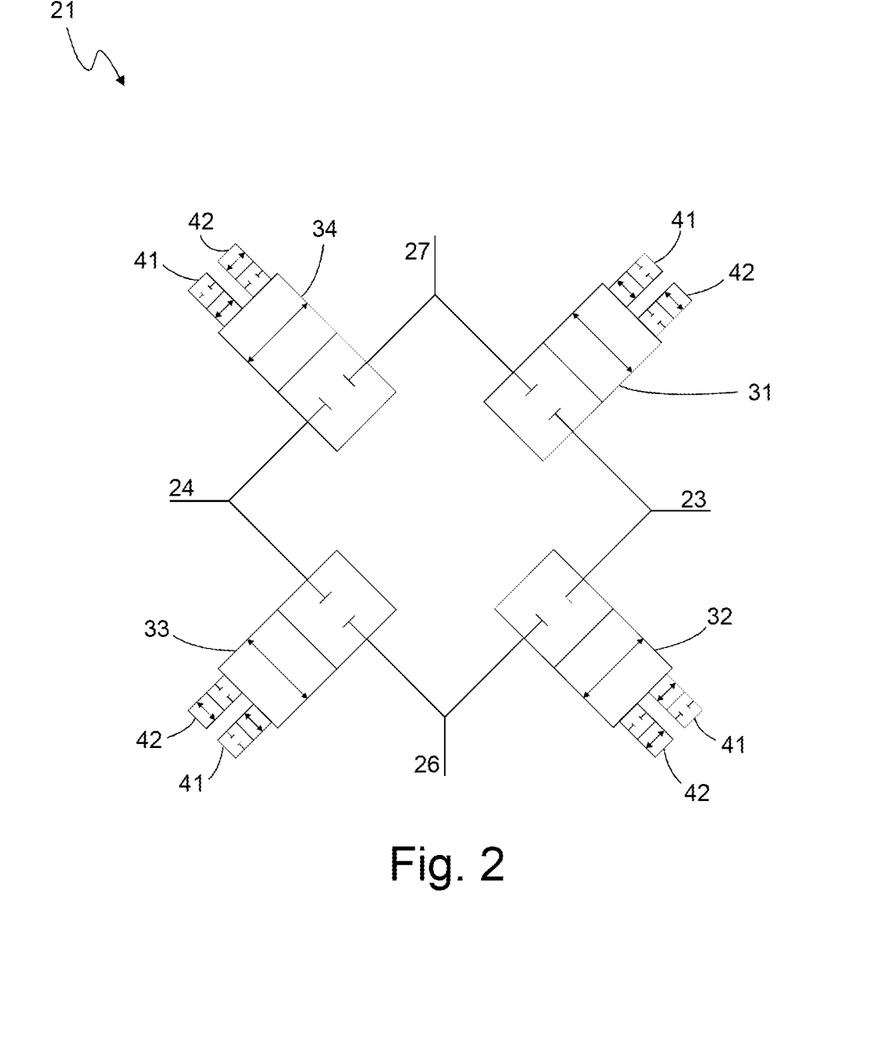

Hereinafter, the provision of the pressures for the pressure chambers 8, 9 is dealt with in more detail:

FIG. 2 shows an exemplary valve device 21, with which the pressures for the pressure chambers 8, 9 can be provided. The valve device 21 is part of the pressurised fluid provision device 4, in particular of the valve arrangement 14, preferably of a valve module 17.

The valve device 21 comprises both pressure outlets 23, 24, with which two separate pressures can be provided. The valve device 21 further comprises a de-venting connection 26 which is connected or connectable to a de-venting conduit, and a venting connection 27 which is connected or connectable to a venting conduit. Expediently, at the venting connection 27 a supply pressure is present and/or at the de-venting connection 26 the atmospheric pressure is present.

The pressure outlets 23, 24 can expediently each be set, in particular closed-loop controlled, to an arbitrary pressure between a maximal pressure, for example the supply pressure, which is provided by the venting connection 27, and a minimal pressure, for example the atmospheric pressure, which is provided by the de-venting connection 26.

Furthermore, the valve device 21 comprises an adjustable throttle opening (not shown in the figures) expediently for each pressure outlet 23, 24, through which throttle opening the pressurised fluid which is provided at the pressure outlets 23, 24 runs.

The valve device 21 in FIG. 2 by way of example is designed as a full bridge of four 2/2-way valves 31, 32, 33, 34. A first 2/2-way valve 31 is connected between the venting connection 27 and the first pressure outlet 23, a second 2/2-way valve is connected between the first pressure outlets 23 and the de-venting connection 26, a third 2/2-way valve is connected between the de-venting connection 26 and the second pressure outlet 24 and a fourth 2/2-way valve is connected between the second pressure outlet 24 and the venting connection 27

The first pressure outlet is selectively connectable to the de-venting conduit via the first 2/2-way valve or to the venting conduit via the second 2/2-way valve and the second pressure outlet is selectively connectable to the de-venting conduit via the third 2/2-way valve or to the venting conduit via the fourth 2/2-way valve.

Each 2/2-way valve 31, 32, 33, 34 is designed by way of example as a proportional valve; i.e. each 2/2-way valve 31, 32, 33, 34 comprises a valve element (not shown in the figures) which can be brought into an open position, a closed position and arbitrary intermediate positions between the open and the closed position. Preferably, the 2/2-way valves 31, 32, 33, 34 are pilot-operated valves which each comprise two pilot valves 41, 42, via which the valve element can be actuated. The pilot valves 41, 42 by way of example are designed as piezo-valves. Expediently, the aforementioned throttle opening can be adjusted via the position of the valve element.

By way of example, the first and the second 2/2-way valves 31, 32 form a first half bridge and the third and fourth 2/2-way valves 33, 34 form a second half bridge. Preferably, the pressure and/or the throttle opening of the first pressure outlet 23 can be set via the first half bridge and the pressure and/or the throttle opening of the second pressure outlet 24 via the second half bridge.

Hereinafter, the successive change of the pressure and/or of the throttle opening which is carried out by the pressurised fluid provision device 4 is dealt with in more detail with reference to FIG. 1.

As already described above, the pressurised fluid provision device 4 is designed to successively change a pressure of the pressurised fluid and/or a throttle opening which is used for providing the pressurised fluid, according to a predefined value course 28 whilst the actuator element 3 is situated in movement towards the predefined position, in order to influence the movement of the actuator element.

An exemplary value course 28 is shown in the diagram 50 of FIG. 1. A pressure (as a pressure graph 39), a throttle opening (as a throttle opening graph 40) and the speed of the actuator element 3 (as a speed graph 43) are each plotted against time tin the diagram 50.

At the beginning, the actuator element 3 is situated in an idle position, for example in the second end position. The pressurised fluid provision device 4 provides a control signal, according to which the actuator element 3 is to be moved into a predefined position, for example the first end position. According to the control signal, the pressurised fluid provision device 4 provides a desired pressure value p0 and/or a desired throttle opening value q0 and sets a pressure and/or throttle opening according to the desired pressure value p0 and/or the desired throttle opening value q0.

The desired pressure value p0 can correspond to or be smaller than the maximally providable pressure, for example the supply pressure. Furthermore, the desired throttle opening value q0 can correspond to the maximal throttle opening or be smaller.

In particular, via the throttle opening one influences how rapidly the pressurised fluid can flow from the pressure outlet 23, 24 into the pressure chamber 8, 9 and/or from the pressure chamber 8, 9 into the pressure outlet 23, 24. The throttle opening herewith in particular determines how quickly the pressure in the pressure chamber 8, 9 can be changed.

By way of the pressure application to the fluidic actuator 2 according to the desired pressure valve p0, the actuator element 3 is brought into movement, as can be gathered from the speed graph 43.

The actuator element 3 moves over a section, expediently over more than half, of the movement path, towards the predefined position. Preferably, no change of the desired pressure value p0 and/or of the desired throttle opening value q0 takes place during this movement section. In particular, no closed-loop position control and/or closed-loop movement control of the actuator element 3 takes place.

Before the actuator element 3 reaches the predefined position—thus during the movement of the actuator element 3—the predefined value course 28 is initiated; i.e., the pressurised fluid provision device 4 begins to successively change the desired pressure value and/or the desired throttle opening value according to the predefined value course 28.

The value course 28 by way of example comprises a pressure value course 29 as well as a throttle opening value course 30. Alternatively to this, the value course 28 can also be provided without the pressure value course 29 or without the throttle opening value course 30. The subsequent explanations of the value course 28 in particular apply to the pressure value course 29 and/or to the throttle opening value course 30.

The movement apparatus 1 is expediently designed to change the pressure of the pressurised fluid according to the predefined value course 28 via the first pressure outlet 23 and to change the throttle opening according to the predefine value course 28 via the second pressure outlet 29. As a result, the pressure change and the throttle opening change take place at different pressure outlets 23, 24.

By way of example, with regard to the pressure outlet which is assigned to the pressure chamber which expands (during the actuator element movement which is to be executed), the pressure is changed and/or, with regard to the pressure outlet which is assigned to the pressure chamber which contracts (during the actuator element movement which is to be executed), the throttle opening is changed.

Concerning a movement of the actuator element 3 into the first end position, by way of example the pressure in the first pressure chamber 8 is changed according to the pressure value course 29 and/or the throttle opening of the second pressure outlet 24 is changed according to the throttle opening value course 20. Given a movement of the actuator element 3 into the second end position, accordingly the pressure in the second pressure chamber 9 is changed according to the pressure value course 29 and/or the throttle opening of the first pressure outlet 23 is changed according to the throttle opening value course 30.

Expediently, the pressurised fluid provision device 4 is designed to specify one of the pressure outlets 23, 24 for the pressure change according to the value course 28 and/or another pressure outlet 23, 24 for the throttle opening change according to the value course 28, depending on whether the actuator element 3 is to be positioned into the first predefined position, for example the first end position, or into a second predefined position, for example the second end position.

By way of example, the value course 28 is a reducing course; i.e., the desired pressure value and/or the desired throttle opening value are successively reduced. In particular, the value course 28 is a constantly, monotonously and/or linearly reducing course. Furthermore, the value course 28 can also have a sigmoidal course as subsequently described with reference to FIG. 4. Expediently, the value course 28 has the shape of a ramp, in particular a linear ramp. By way of the reduction of the pressure and/or the throttle opening, the actuator element 3 can be braked before it reaches the predefined position, in particular an end position. In this manner, a damped or gentle movement can be achieved. By way of lowering the pressure (in the "driving" pressure chamber), the force which drives the actuator element is reduced. By way of the reduction of the throttle opening (in the other pressure chamber) the escape of pressurised fluid is slowed down, so that the pressure drops more slowly and consequently counteracts the movement of the actuator element for longer.

The movement of the actuator element 3 towards the predefined position can therefore be damped by way of the value course 28—in particular by way of a digital control. Expediently, no mechanical damping element is present for damping the movement of the actuator element 3 towards the predefined position.

By way of example, the value course 28 comprises a plurality of target values which together expediently result in a target value sequence. By way of example, the value course 28, in particular the pressure value course 29 and/or the throttle opening value course 30 each have different target values p1, p2, p3, p4 and q1, q2, q3, q4. Alternatively to this, the value course 28 can also comprise more or fewer target values, in particular at least three, preferably at least 10 or 20 different target values (preferably respectively for the pressure value course 29 and/or the throttle opening value course). Expediently, the movement apparatus 1 is designed to adapt the number of target values and/or their temporal resolution in accordance with a cycle time, in particular a cycle time of a bus communication for transferring the target values, preferably in a manner such that a transfer rate of one target value per cycle is achieved.

The pressurised fluid provision device 4 is designed to successively change the pressure of the pressurised fluid and/or to successively change the throttle opening on the basis of these target values. In particular, the pressurised fluid provision device 4 is designed to successively set the desired pressure value and/or the desired throttle opening value to these target values.

Expediently, the target values have a fixed temporal relation to one another within the predefined value course. In particular, the pressurised fluid provision device 4 is designed to carry out the successive change of the pressure and/or of the throttle opening in a time-controlled manner. Expediently, each target value is assigned to a time value.

Each time value is expediently defined relative to the beginning of the value course 28.

By way of example, the time values t1, t2, t3, t4 are assigned to the target values p1, p2, p3, p4 of the pressure value course 29. Furthermore, expediently the time values t1, t2, t3, t4 or alternatively to this, other time values, are likewise assigned to the target values q1, q2, q3, q4 of the throttle opening course.

The time values t1, t2, t3, t4 in particular are defined relative to the beginning of the value course 28. By way of example, the first time value t1=0; i.e., the first target value p1 and/or q1 are set as the setpoint directly at the beginning of the value course. The subsequent target values are then successively set as the setpoint for the pressure and/or for the throttle opening of the first and/or second pressure outlet 23, 24 according to the associated time values—thus in a time-controlled manner at the point in time which is defined by the respective time value.

The target values together preferably result in a ramp function which can expediently assume one of several, in particular different, predefined signal shapes. The signal shapes can be stored in the movement apparatus 1 for example as profiles.

By way of example, consecutive target values of the target course 28 temporally have the same distance to one another; alternatively to this the distances between consecutive target values can also vary.

Figure 4:
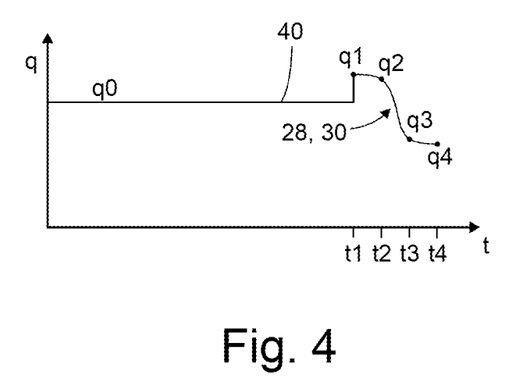

FIG. 4 shows a further exemplary value course 28 which here expediently serves as a throttle opening course 30, which may alternatively or additionally also serve as a pressure value course. With the exception of the differences which are explained hereinafter, the value course 28 which is shown in FIG. 4 corresponds to the value course 28 which is described above and which is shown in FIG. 1, so that that which has been said above also applies to FIG. 4.

The value course 28 of FIG. 4 differs from the value course 28 of FIG. 1, in particular in that it has the shape of a Sigmoid function, in particular a reducing Sigmoid function.

Furthermore, the value course 28 of FIG. 4 differs from the value course 28 of FIG. 1 in particular in that the first target value q1 is increased with respect to the desired throttle opening value q0. The throttle opening course 30 therefore firstly effects a jump upwards.

It has been found that with a combination of both aspects—thus the initial, in particular abrupt increase and the subsequent Sigmoidal reduction—a particularly good damping of the movement of the actuator element can be achieved.

Expediently, the throttle opening course 30 is used for the pressure outlet of the pressure chamber which contracts during the actuator element movement which is to be carried out. By way of the initial increase of the throttle opening, it is possible for the pressurised fluid which is present in the contracting pressure chamber to flow away quickly enough, so that the pressurised fluid which is present in the contracting pressure chamber does not effect too harsh a braking of the movement of the actuator element 3. By way of the subsequent Sigmoidal reduction of the throttle opening, a gentle braking of the movement of the actuator element 3 can then be ensured.

The value course 28 is expediently initiated in response to a predefined event. The pressurised fluid provision device 4 is consequently designed to begin the change of the pressure and/or of the throttle opening according to the value course 28 in response to a predefined event. The predefined event in particular is the detection of a position, in particular a predefined position, of the actuator element 3. The predefined position is expediently located between the two end positions, in particular in the region of an end position. In FIG. 1, the predefined position by way of example is shown by a dashed line which runs from the fluid actuator 2 to the diagram 50.

The movement apparatus 1 is designed, amid the use of the sensor device 10, to detect that the actuator element 3 is located at the predefined position (whilst the actuator element 3 moves towards the predefined position) and in response to this detection to initiate the change of the pressure and/or of throttle opening according to the value course 28.

By way of example, the sensor device 10 is designed to detect the position of the actuator element 3 along a section of the movement path. Preferably, the predefined position, at which the change according to the value course 28 is activated, can be set and/or freely changed within this section.

For setting the pressure and/or the throttle opening at the pressure outlets 23, 24, expediently a first application is present, which for example is provided on the control unit 19, the superordinate controller 15 and/or the cloud server 16. The first application in particular serves for setting the desired pressure value and/or the desired throttle opening value for the pressure outlets 23, 24 and for controlling the valve arrangement 14, in particular a valve module 17, for example the valve device 21, according to the desired pressure value and/or the desired throttle opening value, in order to provide a corresponding pressure and/or throttle opening. In particular, the first application carries out a closed-loop pressure control and/or closed-loop throttle opening control.

The target values of the value course 28, to which the designed pressure value and/or the desired throttle opening value are to be set, are expediently generated outside the first application and are transferred to the first application, in particular in a successive manner.

Expediently, the target values of the value course 28 are provided, in particular generated, by a second application. The second application is preferably located at the control unit 19, but can alternatively or additionally to this also be provided at the superordinate controller and/or the cloud server 16. By way of example, the second application is designed to generate the target values of the value course and to successively transfer them to the first application. Expediently, the transfer takes place at the aforementioned time values t1, t2, t3, t4.

The value course is created in particular on the basis of one or more value course parameters. Value course parameters are for example a starting target value, end target value, a temporal interval between the starting target value and the end target value, a number of target values, a number of target values per unit of time and/or a course shape, for example the aforementioned signal shape of the ramp function.

The pressurised fluid provision device 4 expediently comprises a configuration interface, in particular a user interface, via which one or more value course parameters which define the value course can be set.

The fluidic actuator 2, in particular the movement apparatus 1 can be expediently operated according to a method with the following steps: according to a control signal, impinging the fluidic actuator 2 with pressurised fluid, in order to move the actuator element 3 into a predefined position, and, whilst the actuator element 3 is in movement towards the redefined position, successively changing a pressure of the pressurised fluid and/or a throttle opening which is used for providing the pressurised fluid, according to a predefined value course 28, in order to adapt the movement of the actuator element 3.

Expediently, the method is developed further according to one or more of the features which have been explained above in the context of the movement apparatus 1.

Figure 3:
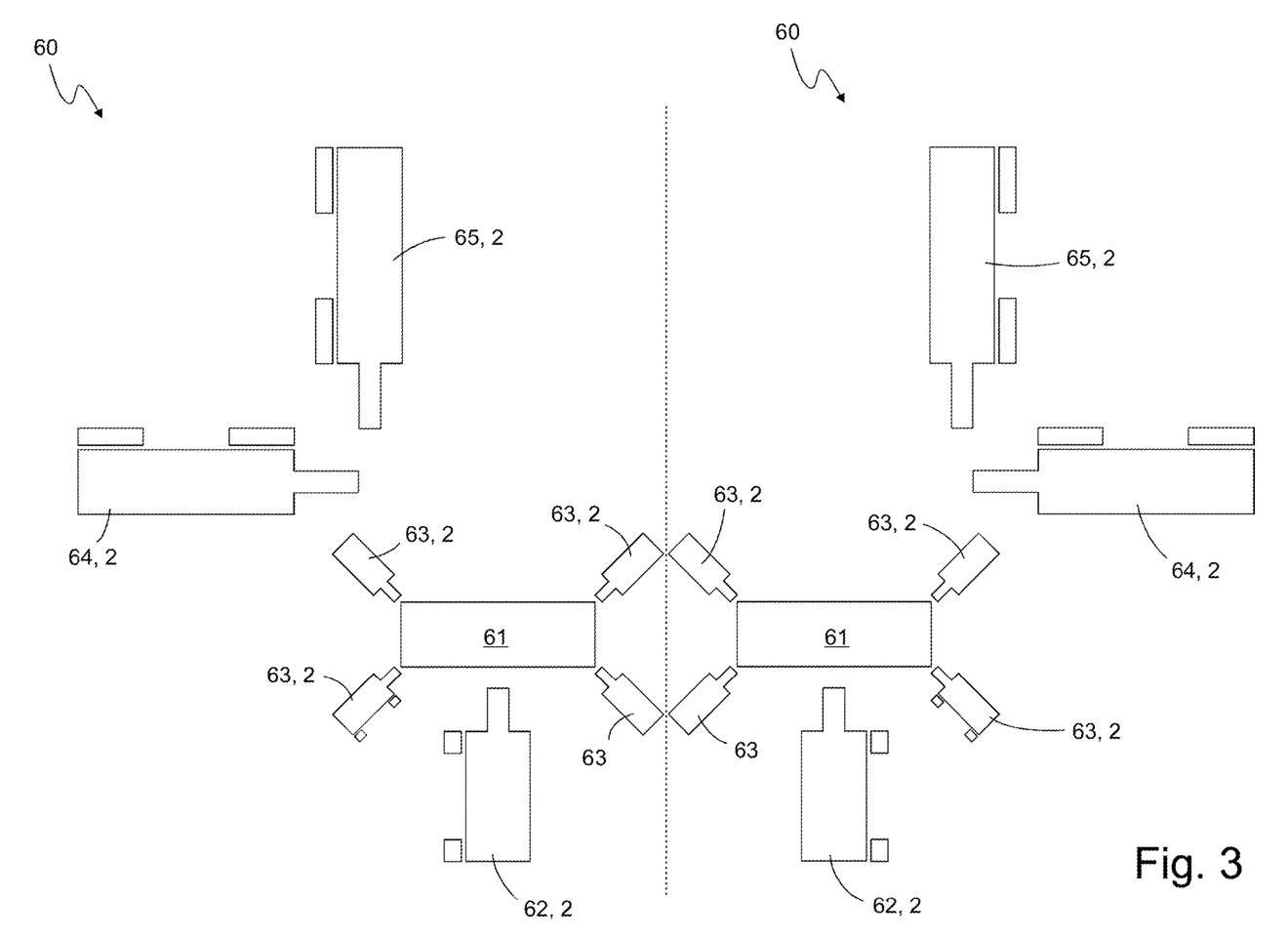

FIG. 3 shows a tire handling apparatus 60. The tire handling apparatus 60 comprises a movement apparatus, said movement apparatus being designed according to the movement apparatus 1 which is explained above, and expediently comprises a plurality of fluidic actuators 2. The movement apparatus comprises the pressurised fluid provision device which is not shown in the FIG. 3

The tire handling apparatus 60, in particular one or more of the fluidic actuators 2 expediently serve for handling a tire, in particular a tire blank 61. In particular, the tire handling apparatus 60 serves for transporting a tire blank 61 into a tire press. The tire blank 61 is expediently provided with a tire profile in the tire press.

The tire handling apparatus 60 by way of example comprises a prepositioning device 62, a gripping device 63, a vertical positioning device 64 and/or a horizontal positioning device 65.

Expediently, the prepositioning device 62, the gripping device 63, the vertical positioning device 64 and/or the horizontal positioning device 65 each comprise one or more fluidic actuators 2. Expediently, the movement apparatus is designed to control one or more of the fluidic actuators 2 according to the aforementioned manner—thus amid the use of a value course 28—in order to adapt the movement of one or more actuator elements. Expediently, a fluidic actuator of the vertical positioning device 64 and/or of the horizontal positioning device 64 is controlled in the described manner. In particular, the movement apparatus is designed, by way of using the value course 28, to achieve a braking of the actuator element before the actuator element reaches a predefined position, for example an end position. In this manner, a damped or gentle moving into the defined position, for example the end position can be achieved.

The prepositioning device 62 in particular serves for vertically positioning the tire blank 61 such that it can be gripped by the gripping device 63. The prepositioning device 62 comprises a fluidic actuator 2 for positioning the tire blank 61.

The gripping device 63 in particular serves for gripping the tire blank 61, for holding it during the further transport and on reaching the transport target—in particular the tire press—for letting go of the tire blank 61. By way of example, the gripping device 63 comprises four fluidic actuators 2.

The vertical positioning device 65 in particular serves for vertically positioning the tire blank 61 and/or the gripping device 63. The vertical positioning device by way of example comprises a fluid actuator 2.

The horizontal positioning device 64 in particular serves for horizontally positioning the tire blank 61 and/or the gripping device 63, in particular for pivoting it, preferably about a vertical pivot axis. The horizontal positioning device by way of example comprises a fluidic actuator 2.

By way of example, the horizontal positioning device comprises kinematics (not shown in the figures), with which a pivoting movement is provided on the basis of a linear movement of the fluidic actuator 2.

On operation, the tire blank 61 is placed onto the prepositioning device 62, is vertically positioned by this, then gripped by the gripping device 63, is vertically positioned by the vertical positioning device 65, then horizontally positioned by the horizontal positioning device and finally put into the tire press.

By way of example, a system of two tire handling apparatuses 60 is provided, wherein expediently one tire handling apparatus is arranged directly next to the other tire handling apparatus. The two tire handling apparatuses are expediently designed mirror-symmetrically to a vertical mirror plane.

Preferably, the two tire handling apparatuses 60 are operated synchronously to one another. Expediently, the two tire handling apparatuses are independently of one another and/or in particular not mechanically coupled. In each tire handling apparatus 60, the aforementioned control of a fluidic actuator 2 using the value course 28 is used. Expediently, one or several individually adapted value courses 28 are used for each tire handling apparatus 60, so that the movements which are provided by the tire handling apparatuses 60 are expediently matched to one another and in particular take their course in a synchronous manner. For example, expediently one or more value courses 28 are used in the one tire handling apparatus 60 and these differ from one or more value courses 28 which are used on the other tire handling apparatus 60 and which are used for respective fluid actuators 2. For example, for the fluid actuator 2 of the horizontal positioning device 64 of the one tire handling apparatus 60, one uses a different value course than for the fluidic actuator 2 of the horizontal positioning device 64 of the other tire handling apparatus 60.

For the control of the fluid actuators 2, the system can comprise one or more pressurised fluid provision devices 4, in particular one or more valve arrangement 14. Preferably, an individual valve arrangement 14 is used for each tire handling apparatus 60. Alternatively to this, a valve arrangement 14 can be used for both tire handling apparatus. Expediently, each fluid actuator 2 is controlled via an assigned valve module 17.

The pressurised fluid provision device 4, in particular the control unit 19, is expediently design to generate, in particular to compute the value course 28, in particular the pressure value course 29 and/or the throttle opening value course 30.

The control unit 19 is preferably part of the valve arrangement 14. Preferably, the control unit 19 in particular is a plate-shaped module which is arranged on the base body 20. According to a possible design, the control unit 19 can comprise two in particular plate-shaped modules which are arranged on the base body 20.

According to a preferred design, the pressurised fluid provision device 4, in particular the control unit 19 is designed to generate, in particular to compute, the value course 28, in particular the pressure value course 29 and/or the throttle opening value course 30, on the basis of one or more value course parameters.

For example, the pressurised fluid provision device 4, in particular the control unit 19, is designed to generate, in particular compute, the pressure value course 29 on the basis of a first starting position parameter, a first end position parameter, a starting pressure parameter and/or an end pressure parameter.

The starting pressure parameter for example specifies the first target value, by way of example the target value p1, of the pressure value course 29 which is to be generated. The end pressure parameter for example specifies the last target value, by way of example the target value p4, of the pressure value course 29 which is to be generated. The pressurised fluid provision device 4, in particular the control unit 19, is expediently designed to compute, in particular to interpolate the target values which lie between the first and the last target value of the pressure value course 29, by way of example the target values p2, p3, on the basis of the starting pressure parameter and the end pressure parameter. In particular, the computation of these target values is effected on the basis of a predefined course shape, in particular a predefined signal shape of the ramp function. The pressurised fluid provision device 4, in particular the control unit 19, is designed to provide and expediently store the pressure value course 29 on the basis of the inputted first target value, the inputted last target value and the computed target values which lie between the first target value and the last target value.

The first starting position parameter expediently specifies the position of the actuator element 3, at which the pressurised fluid provision device 4 is to begin with changing the pressure according to the pressure value course 29. Preferably, the pressurised fluid provision device 4 is designed to set the pressure of the pressurised fluid to the first target value p1 of the pressure value course 29 when the actuator element 3 reaches the position which is specified by the first starting position parameter.

The first end position parameter expediently specifies the position of the actuator element 3, at which the change of the pressure of the pressurised fluid according to the pressure value course 29 is to be completed.

For example, the pressurised fluid provision device 4, in particular the control unit 19 is further designed to generate, in particular to compute, the throttle opening value course 30 on the basis of a second starting position parameter, a second end position parameter, a starting throttle opening parameter and/or an end throttle opening parameter.

The starting throttle opening parameter for example specifies the first target value, by way of example the target value q1, of the throttle opening value course 30 which is to be generated. The end throttle opening parameter for example specifies the last target value, by way of example the target value q4, of the throttle opening course 30 which is to be generated. The pressurised fluid provision device 4, in particular the control unit 19 is expediently designed to compute, in particular interpolate, the target values which lie between the first and the last target value of the throttle opening value course 30, by way of example the target values q2, q3, on the basis of the starting throttle opening parameter and of the end throttle opening parameter. In particular, the computation of these target values is effected on the basis of a predefined course shape, in particular a predefined signal shape of the ramp function. The pressurised fluid provision device 4, in particular the control unit 19, is designed to provide and expediently store the throttle opening value course 30 on the basis of the inputted first target value, the inputted last target value and the computed target values which lie between the first target value and the last target value.

The second starting position parameter expediently specifies the position of the actuator element 3, at which the pressurised fluid provision device 4 is to begin with the changing of the throttle opening according to the throttle opening value course 30. Preferably, the pressurised fluid provision device 4 is designed to set the throttle opening to the first target value of the throttle opening value course 30 when the actuator element 3 reaches the position which is specified by the second starting position parameter.

The second end position parameter expediently specifies the position of the actuator element 3, at which the change of the throttle opening according to the throttle opening value course 30 is to be completed.

According to a possible design, the pressurised fluid provision device 4, in particular the control unit 19, is designed to use the first starting position parameter and/or the first end position parameters alternatively to the second starting position parameter and/or to the second end position parameter.

The pressurised fluid provision device 4 preferably comprises a user interface, via which the first starting position parameter, the first end position parameter, the starting pressure parameter and/or the end pressure parameter can be inputted by a user. Expediently, furthermore the second starting position parameter, the second end position parameter, the starting throttle opening parameter and/or the end throttle opening parameter can be inputted by the user via the user interface.

The user interface is expediently provided at the control unit 10, the superordinate controller 15, the cloud server 16 and/or a user end device.

Figure 5:
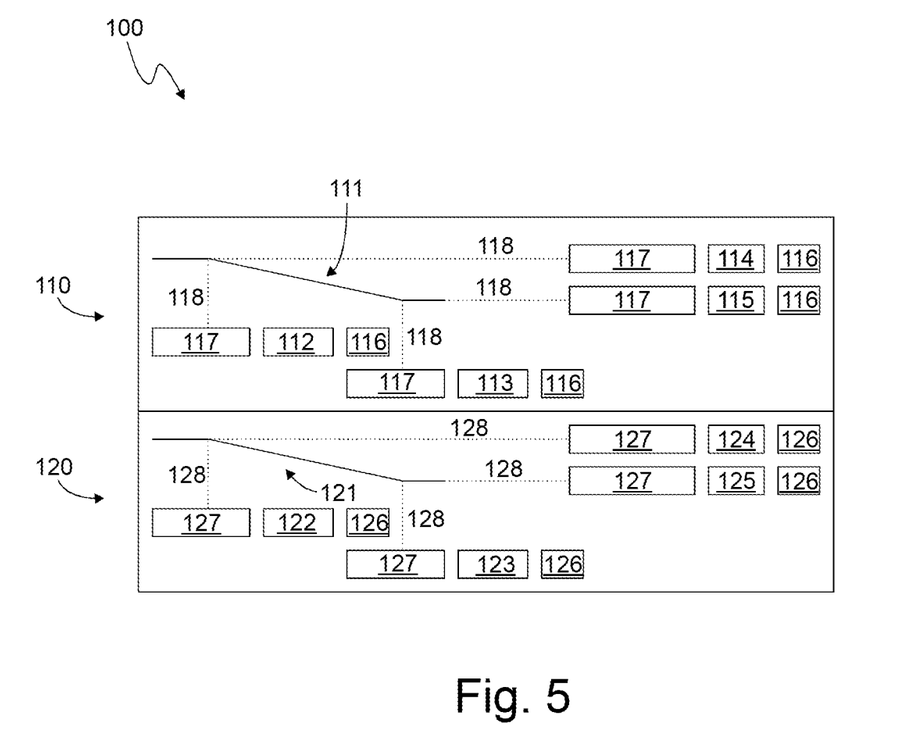

The user interface expediently comprises a user interface 100 which in particular is designed as a graphic user interface.

Hereinafter, an exemplary design of the user interface 100 as a graphic user interface is dealt with reference to FIG. 5.

The user interface 100 expediently comprises a first input section 100. The first input section 110 serves for inputting the parameter for the generation of the pressure value course 29. The user interface 100 preferably further comprises a second input section 120. The second input section 120 serves for the input of the parameters for the generation of the throttle opening course 30. By way of example, the user interface 100 simultaneously displays the first input section 100 and the second input section 120, and specifically below one another.

The first input section 110 by way of example comprises a first starting position input field 112 for inputting the first starting position parameter, a first end position input field 113 for inputting the first end position parameter, a starting pressure input field 114 for inputting the starting pressure parameter and/or an end pressure input field 115 for inputting the end pressure parameter.

Optionally, the first input section 110 further comprises several first designation fields 117 and/or first unit fields. By way of example, a respective first designation field 117 and/or a respective first unit field 116 is assigned to each input field 112, 113, 114, 115. Each first designation field 117 contains the designation of the parameter which can be inputted with the respectively assigned input field and each unit field 116 contains the physical unit of the parameter which can be inputted with the respectively assigned input field.

Optionally, the first input section 10 further comprises a first ramp representation 111. The first ramp representation 111 by way of example is a graphic representation of a ramp. By way of example, the first starting position input field 112 and/or the starting pressure input field 114 are assigned to the beginning of the ramp, by way of example via first assignment lines 118. Furthermore, by way of example the first end position input field 113 and/or the end pressure input field 115 is assigned to the end of the ramp, by way of example via first assignment lines 118.

The second input section 120 by way of example comprises a second starting position input field 112 for inputting the second starting position parameter, a second end position input field 123 for inputting the second end position parameter, a starting throttle opening input field 124 for inputting the starting throttle opening parameter and/or an end throttle input field 125 for inputting the end throttle opening parameter.

Optionally, the second input section 120 further comprises several second designation fields 127 and/or second unit fields 126. By way of example, a respective second designation field 127 and/or a respective second unit field 126 is assigned to each input field 122, 123, 124, 125. Each second designation field 127 comprises the designation of the parameter which can be inputted with the respectively assigned input field and each second unit field 126 comprises the physical unit of the parameter which can be inputted with the respectively assigned input field.

Optionally, the second input section 120 further comprises a second ramp representation 121. The second ramp representation 121 by way of example is a graphic representation of a ramp. By way of example, the second starting position input field 112 and/or the starting throttle opening input field 124 are assigned to the beginning of the ramp, by way of example via second assignment lines 128. Furthermore, by way of example, the second end position input field 123 and/or the end throttle opening input field 125 are assigned to the end of the ramp, by way of example via second assignment lines 128.

The pressurised fluid provision device 4, in particular the control unit 19, is designed to store the parameters which are inputted by way of the user interface, in particular the user interface 100, as a set of parameters and expediently to generate, in particular to compute, the value course 28, in particular the pressure value course 29 and/or the throttle opening value course 30, on the basis of the stored set of parameters.

The pressurised fluid provision device 4, in particular the control unit 19 is expediently designed to generate, in particular compute (in particular in a complete manner) the value course 28, in particular the pressure value course 29 and/or the throttle opening value course 30 without carrying out a closed-loop position control and/or a closed-loop movement control of the actuator element 3. The value course 28, in particular the pressure value course 29 and/or the throttle opening value course 30 is therefore expediently not the result of a closed-loop position control of the actuator element 3 and/or not the result of a closed-loop movement control of the actuator element 3. In particular, the pressurised fluid provision device 4 does not carry out a closed-loop position control and/or closed-loop movement control of the actuator element 3 for the computation of the value course 28, in particular of the pressure value course 29 and/or of the throttle opening value course 30.

Preferably, the pressurised fluid provision device 4, in particular the control unit 19 is designed to compute the value course 28, in particular the pressure value course 29 and/or the throttle opening value course 30 (in particular in a complete manner), before the pressurised fluid provision device 4 begins the change of the pressure and/or the throttle opening according to the value course 28. In particular, what is meant by a complete computation is the computation of all target values. In particular, the pressurised fluid provision device 4 is designed to compute the value course 28 in particular in a complete manner, before the aforementioned predefined event occurs, by which the pressurised fluid provision device 4 is caused to begin to change the pressure and/or the throttle opening according to the value course 28.

According to a possible design, the pressurised fluid provision device 4 is designed to begin the change of the pressure according to the pressure value course 29 in response to a first position of the actuator element 3 and to begin the change of the throttle opening according to the throttle opening course 30 in response to a second position of the actuator element 3 which is different to the first position. The second position expediently lies in front of the first position (on the path of the actuator element 3 towards the predefined position), so that the actuator element 3 firstly reaches the second position and then the first position. For example, the first starting position parameter specifies a different position than the second starting position parameter.

The pressure value course 29 and the throttle opening value course 30 are therefore run through offset to one another. It has been found that a particularly good movement control of the actuator element 3 is possible in this way.

The pressurised fluid provision device 4 is expediently designed not to carry out a closed-loop position control and/or a closed-loop movement control of the actuator element 3 during the change of the pressure according to the pressure value course 29 and/or during the change of the throttle opening according to the throttle opening course 30.

The invention claimed is:

1. A movement apparatus for industrial automation, comprising:
    a fluidic actuator to which a pressurised fluid can be applied, the fluidic actuator having an actuator element, and
    a pressurised fluid provision device which is designed to apply the pressurised fluid to the fluidic actuator according to a control signal, in order to move the actuator element into a predefined position,
    wherein the pressurised fluid provision device is designed to, whilst the actuator element is in movement towards the predefined position, successively change a pressure of the pressurised fluid according to a predefined pressure value course and to successively change a throttle opening which is used for providing the pressurised fluid according to a predefined throttle opening value course, and
    wherein the fluidic actuator comprises two pressure chambers and the pressurised fluid provision device comprises a first pressure outlet for pressurizing a first pressure chamber of the two pressure chambers and a second pressure outlet for pressurizing a second pressure chamber of the two pressure chambers, and
    wherein the pressurised fluid provision device is designed to change the pressure of the pressurised fluid according to the predefined pressure value course via the first pressure outlet and to change the throttle opening according to the predefined throttle opening value course via the second pressure outlet, and
    wherein the predefined pressure value course is different from the predefined throttle opening value course.

2. The movement apparatus according to claim 1, wherein the predefined pressure value course and the predefined throttle opening value course are not subject to a closed-loop position control and/or closed-loop movement control.

3. The movement apparatus according to claim 1, wherein the pressurised fluid provision device is designed to completely compute the predefined pressure value course and the predefined throttle opening value course before the pressurised fluid provision device successively changes the pressure and/or the throttle opening.

4. The movement apparatus according to claim 1, wherein the predefined pressure value course and the predefined throttle opening value course each comprise at least three different target values and the pressurised fluid provision device is designed to successively change the pressure of the pressurised fluid and/or to successively change the throttle opening, on the basis of these target values.

5. The movement apparatus according to claim 4, wherein the target values have a fixed temporal relation to one another within the predefined pressure value course and the predefined throttle opening value course.

6. The movement apparatus according to claim 4 wherein the predefined pressure value course and the predefined throttle opening value course are both sinking courses, wherein the predefined pressure value course has the shape of a ramp, wherein the predefined throttle opening value course has the shape of a Sigmoid function, wherein a first target value of the predefined throttle opening value course of the at least three target values is increased with respect to an initial desired throttle opening value of the predefined throttle opening value course.

7. The movement apparatus according to claim 1, wherein the pressurised fluid provision device is designed to begin, during the movement of the actuator element, the change of the pressure according to the predefined pressure value course and/or of the throttle opening according to the predefined throttle opening value course in response to a predefined event.

8. The movement apparatus according to claim 1, wherein the event is a detection of the position of the actuator element.

9. The movement apparatus according to claim 1, wherein the pressurised fluid provision device comprises a first application for setting the pressure and/or the throttle opening and wherein the pressurised fluid provision device is designed to successively transfer target values of the predefined pressure value course and the predefined throttle opening value course to the first application.

10. The movement apparatus according to claim 9, wherein the pressurised fluid provision device comprises a second application for providing the predefined pressure value course and the predefined throttle opening value course.

11. The movement apparatus according to claim 1, wherein the pressurised fluid provision device comprises a configuration interface, via which one or more value course parameters which define the predefined pressure value course and the predefined throttle opening value course can be set.

12. The movement apparatus according to claim 1, wherein the pressurised fluid provision device comprises a valve arrangement which is designed as a series module arrangement and which comprises one or more plate-shaped valve modules for providing the pressurised fluid, which one or more plate-shaped valve modules are placed in a series next to one another.

13. The movement apparatus according to claim 1, wherein the pressurised fluid provision device comprises a first and a second pressure outlet as well as four 2/2-way valves which are connected as a full bridge.

14. The movement apparatus according to claim 1, wherein the movement apparatus serves for handling a workpiece.

15. The movement apparatus according to claim 1, wherein the pressurised fluid provision device comprises a first and a second pressure outlet as well as four 2/2-way valves which are connected as a full bridge, and
wherein the pressurised fluid provision device further comprises a de-venting connection which is connected or connectable to a de-venting conduit, and a venting connection which is connected or connectable to a venting conduit, and wherein a first 2/2-way valve of the four 2/2-way valves is connected between the venting connection and the first pressure outlet, a second 2/2-way valve of the four 2/2-way valves is connected between the first pressure outlet and the de-venting connection, a third 2/2-way valve of the four 2/2-way valves is connected between the de-venting connection and the second pressure outlet and a fourth 2/2-way valve of the four 2/2-way valves is connected between the second pressure outlet and the venting connection.

16. A tire handling apparatus comprising a movement apparatus for industrial automation, the movement apparatus comprising:
a fluidic actuator to which a pressurised fluid can be applied, the fluidic actuator having an actuator element, and
a pressurised fluid provision device which is designed to apply the pressurised fluid to the fluidic actuator according to a control signal, in order to move the actuator element into a predefined position,
wherein the fluidic actuator serves for handling a tire, and
wherein the pressurised fluid provision device is designed to, whilst the actuator element is in movement towards the predefined position, successively change the pressure of a pressurised fluid according to a predefined pressure value course and to successively change the throttle opening which is used for providing the pressurised fluid according to a predefined throttle opening value course, and
wherein the fluidic actuator comprises two pressure chambers and the pressurised fluid provision device comprises a first pressure outlet for pressurizing a first pressure chamber of the two pressure chambers and a second pressure outlet for pressurizing a second pressure chamber of the two pressure chambers, and
wherein the pressurised fluid provision device is designed to change the pressure of the pressurised fluid according to the predefined pressure value course via the first pressure outlet and to change the throttle opening according to the predefined throttle opening value course via the second pressure outlet, and
wherein the predefined pressure value course is different from the predefined throttle opening value course.

17. A method for the operation of a fluidic actuator to which a pressurised fluid can be applied and which has an actuator element, the method comprising:
according to a control signal, applying the pressurised fluid to the fluidic actuator, in order to move the actuator element into a predefined position,
wherein the pressurised fluid provision device is designed to, whilst the actuator element is in movement towards the predefined position, successively change a pressure of the pressurised fluid according to a predefined pressure value course and to successively change a throttle opening which is used for providing the pressurised fluid according to a predefined throttle opening value course, and
wherein the fluidic actuator comprises two pressure chambers and the pressurised fluid provision device comprises a first pressure outlet for pressurizing a first pressure chamber of the two pressure chambers and a second pressure outlet for pressurizing a second pressure chamber of the two pressure chambers, and
wherein the pressurised fluid provision device is designed to change the pressure of the pressurised fluid according to the predefined pressure value course via the first pressure outlet and to change the throttle opening according to the predefined throttle opening value course via the second pressure outlet, and wherein the predefined pressure value course is different from the predefined throttle opening value course.

* * * * *